United States Patent
Shi

(10) Patent No.: US 10,222,662 B2
(45) Date of Patent: Mar. 5, 2019

(54) DISPLAY PANEL AND DISPLAY DEVICE

(71) Applicants: BOE Technology Group Co., Ltd., Beijing (CN); Ordos Yuansheng Optoelectronics Co., Ltd., Inner Mongolia (CN)

(72) Inventor: Dawei Shi, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 0 days.

(21) Appl. No.: 15/545,277

(22) PCT Filed: Jan. 22, 2017

(86) PCT No.: PCT/CN2017/072048
§ 371 (c)(1),
(2) Date: Jul. 20, 2017

(87) PCT Pub. No.: WO2017/206530
PCT Pub. Date: Dec. 7, 2017

(65) Prior Publication Data
US 2018/0157129 A1 Jun. 7, 2018

(30) Foreign Application Priority Data
Jun. 3, 2016 (CN) .................... 2016 2 0542808 U

(51) Int. Cl.
*G02F 1/1333* (2006.01)
*G02F 1/1343* (2006.01)
(Continued)

(52) U.S. Cl.
CPC ...... *G02F 1/134309* (2013.01); *G02F 1/1343* (2013.01); *G02F 1/1368* (2013.01);
(Continued)

(58) Field of Classification Search
None
See application file for complete search history.

(56) References Cited

U.S. PATENT DOCUMENTS

| 8,681,120 B2 | 3/2014 | Kanehira et al. |
| 2011/0148809 A1 | 6/2011 | Kanehira et al. |

(Continued)

FOREIGN PATENT DOCUMENTS

| CN | 104360773 A | 2/2015 |
| CN | 104461154 A | 3/2015 |

(Continued)

OTHER PUBLICATIONS

International Search Report and Written Opinion for International Application No. PCT/CN2017/072048, dated Apr. 28, 2017, 13 pages.
(Continued)

*Primary Examiner* — James A Dudek
(74) *Attorney, Agent, or Firm* — Westman, Champlin & Koehler, P.A.

(57) ABSTRACT

A display panel is provided in the embodiments of the disclosure, including an array substrate, an opposing substrate, and a liquid crystal layer provided between the array substrate and the opposing substrate. The array substrate comprises a plurality of data lines, a plurality of gate lines and a plurality of pixel units distributed in an array, and the opposing substrate comprises a base substrate, a common electrode layer provided on one side of the base substrate facing towards the liquid crystal layer and a first touch electrode provided on the other side of the base substrate facing away from the liquid crystal layer. The common electrode layer comprises a plurality of second touch electrodes in a form of strips, each of the second touch electrodes overlaps or coincides with a projection of at least one row of the pixel units on the opposing substrate, a gap region being (Continued)

formed between each pair of neighboring second touch electrodes and a slot structure being provided within each of the second touch electrodes.

20 Claims, 3 Drawing Sheets

(51) Int. Cl.
*G02F 1/1362* (2006.01)
*G02F 1/1368* (2006.01)
*G06F 3/041* (2006.01)

(52) U.S. Cl.
CPC .... *G02F 1/13338* (2013.01); *G02F 1/136286* (2013.01); *G06F 3/0412* (2013.01); *G02F 2001/134318* (2013.01); *G02F 2201/121* (2013.01)

(56) References Cited

U.S. PATENT DOCUMENTS

| | | |
|---|---|---|
| 2013/0181940 A1 | 7/2013 | Lai et al. |
| 2017/0003822 A1 | 1/2017 | Zhao |
| 2018/0150159 A1* | 5/2018 | Noguchi ............... G06F 3/0416 |

FOREIGN PATENT DOCUMENTS

| | | |
|---|---|---|
| CN | 104777932 A | 7/2015 |
| CN | 205670226 U | 11/2016 |

OTHER PUBLICATIONS

English translation of International Search Report and Box. V of the Written Opinion for International Application No. PCT/CN2017/072048, dated Apr. 28, 2017, 12 pages.

\* cited by examiner

DISPLAY PANEL AND DISPLAY DEVICE

CROSS-REFERENCE TO RELATED INVENTION

This application is a Section 371 National Stage Application of International Application No. PCT/CN2017/072048, filed on 22 Jan. 2017, which has not yet published, and claims priority to Chinese Patent Application No. 201620542808.7 filed on Jun. 3, 2016 in the State Intellectual Property Office of China, the disclosures of which are incorporated herein by reference in their entirety.

BACKGROUND OF THE INVENTION

Field of the Invention

Embodiments of the present disclosure relate to the technical field of a display, and in particular, to a display panel and a display device.

Description of the Related Art

Currently, the so-called flat panel display (FPD) comprises various types, such as, Liquid Crystal Display (LCD), Organic Light Emitting Diode (OLED) display, Plasma Display Panel (PDP) display and E-ink Display and the like. The LCD is a common flat panel display nowadays, within the field of which Thin Film Transistor Liquid Crystal Display (TFT-LCD) functioning as an overwhelming product thereof.

A liquid crystal panel functions as an important component of a liquid crystal display. In a traditional LCD technology, in order to form a touch liquid crystal panel product, a common ITO (nano indium tin oxide) electrode located within the panel also functions as a transmitter electrode, and a receiver electrode is also deposited on a back surface of an opposing substrate which is disposed to be cell-aligned with the liquid crystal panel, both the transmitter electrode and the receiver electrode being shaped into a plurality of parallel strip-shaped electrodes and being disposed perpendicular to each other. The transmitter electrode which also functions as a common electrode comprises a number of strip-shaped electrodes arranged in a direction of a long side of the panel. Generally, the transmitter electrode is of a segmented design; however, within such segmented design, only the common ITO transmitter electrode at an electrode segmented zone defined on the panel is segmented, which electrode segmented zone is excavated/hollowed-out therethrough from a left side to a right side of a practical display zone of the panel.

On one hand, though both the opposing substrate and a black matrix layer function to shield light rays, due to zigzag paths of light rays within the liquid crystal, an abnormal condition of an area shielded by the black matrix layer may be reflected into an opening region of the panel, and in turn influence practical display effect. Therefore, in a gap region of the transmitter electrode, i.e., at a segmentation of a conductive layer of the ITO (nano indium tin oxide) electrode, due to lack of ITO conductive layer, an overall transmittance thereof differs from that in other ordinary regions; therefore, a light intensity therearound is also varied, resulting in black stripes appearing on a display screen. On the other hand, since a lower gate electrode conductive layer at the segmentation of the ITO electrode is in an exposed condition, a voltage of the gate electrode may not be shielded by the common ITO layer; therefore, an electrical field intensity is relatively large there, resulting in a polarization of charged ions in the liquid crystal and in turn a polarized electrical field which may cause abnormality in an orientation electrical field of the liquid crystal, such that there is a difference in the light intensity and a defective display phenomenon of presenting dark-colored stripes visually. Therefore, there exist in present liquid crystal display screen a relatively inferior display uniformity and an abnormal display condition of presenting stripes visually.

SUMMARY OF THE INVENTION

The embodiments of the present disclosure have been made to overcome or alleviate at least one aspect of the above mentioned disadvantages and/or shortcomings in the prior art.

According to an aspect of the exemplary embodiment of the present disclosure, there is provided a display panel, comprising an array substrate, an opposing substrate, and a liquid crystal layer provided between the array substrate and the opposing substrate, wherein the array substrate comprises a plurality of data lines, a plurality of gate lines and a plurality of pixel units distributed in an array, and the opposing substrate comprises a base substrate, a common electrode layer provided on one side of the base substrate facing towards the liquid crystal layer and a first touch electrode provided on the other side of the base substrate facing away from the liquid crystal layer, and wherein the common electrode layer comprises a plurality of second touch electrodes in a form of strips, each of the second touch electrodes overlaps or coincides with a projection of at least one row of the pixel units on the opposing substrate, a gap region being formed between each pair of neighboring second touch electrodes and a slot structure being provided within each of the second touch electrodes.

According to an exemplary embodiment, the slot structure provided within each of the second touch electrodes is shaped to be similar to one gap region.

According to an exemplary embodiment, the slot structure provided within each of the second touch electrodes comprises a plurality of slots, each pair of neighboring slots being spaced apart from each other by the second touch electrode.

According to an exemplary embodiment, the slot structure provided within each of the second touch electrodes comprises a plurality of slots and a plurality of via-holes, one slot being in communication with respective one via-hole so as to form a through opening, and each pair of neighboring through openings being spaced apart by the second touch electrode.

According to an exemplary embodiment, projections of the gate lines or the data lines of the pixel units on the opposing substrate overlap the slot structures.

According to an exemplary embodiment, projections of the gate lines or the data lines of the pixel units on the opposing substrate overlap the gap regions between each pair of neighboring second touch electrodes.

According to an exemplary embodiment, the plurality of slots are arranged in a direction in parallel with a direction of the row of the pixel units.

According to an exemplary embodiment, the plurality of slots and the plurality of via-holes are arranged in a direction in parallel with a direction of the row of the pixel units.

According to an exemplary embodiment, there is a one-to-one correspondence between the plurality of via-holes provided within each of the second touch electrodes and thin film transistors of each pixel unit within the row of the pixel units, respectively.

According to an exemplary embodiment, in edges of the second touch electrodes adjacent to the gap regions, a plurality of throughholes are formed to be in communication with the gap regions.

According to an exemplary embodiment, the first touch electrode is a touch signal receiver electrode and the second touch electrodes are touch signal transmitter electrodes.

According to an exemplary embodiment, the first touch electrode is a touch signal transmitter electrode and the second touch electrodes are touch signal receiver electrodes.

According to another aspect of the exemplary embodiment of the present disclosure, there is provided a display device, comprising the display panel according to any one of above exemplary embodiments.

BRIEF DESCRIPTION OF THE DRAWINGS

The above and other features and advantages of the present disclosure will become more apparent and a more comprehensive understanding of the present disclosure can be obtained, by describing in detail exemplary embodiments thereof with reference to the accompanying drawings, in which.

DETAILED DESCRIPTION OF EMBODIMENTS OF THE DISCLOSURE

Figure 1:
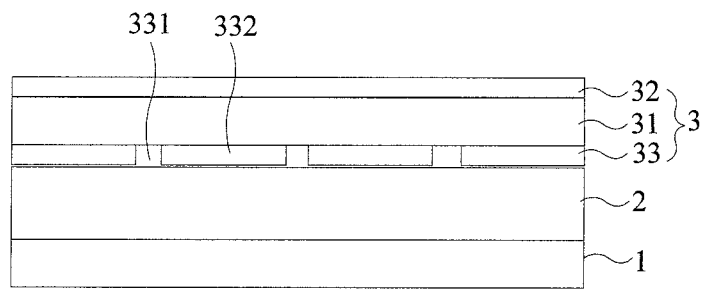
FIG. 1 illustrates a schematic structural view of a display panel according to an exemplary embodiment of the disclosure.

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiment set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of each component in the drawings are only intended to exemplarily illustrate the contents of the disclosure, rather than to demonstrate the practical dimension or proportion of components of the display panel and the display device.

Figure 2:
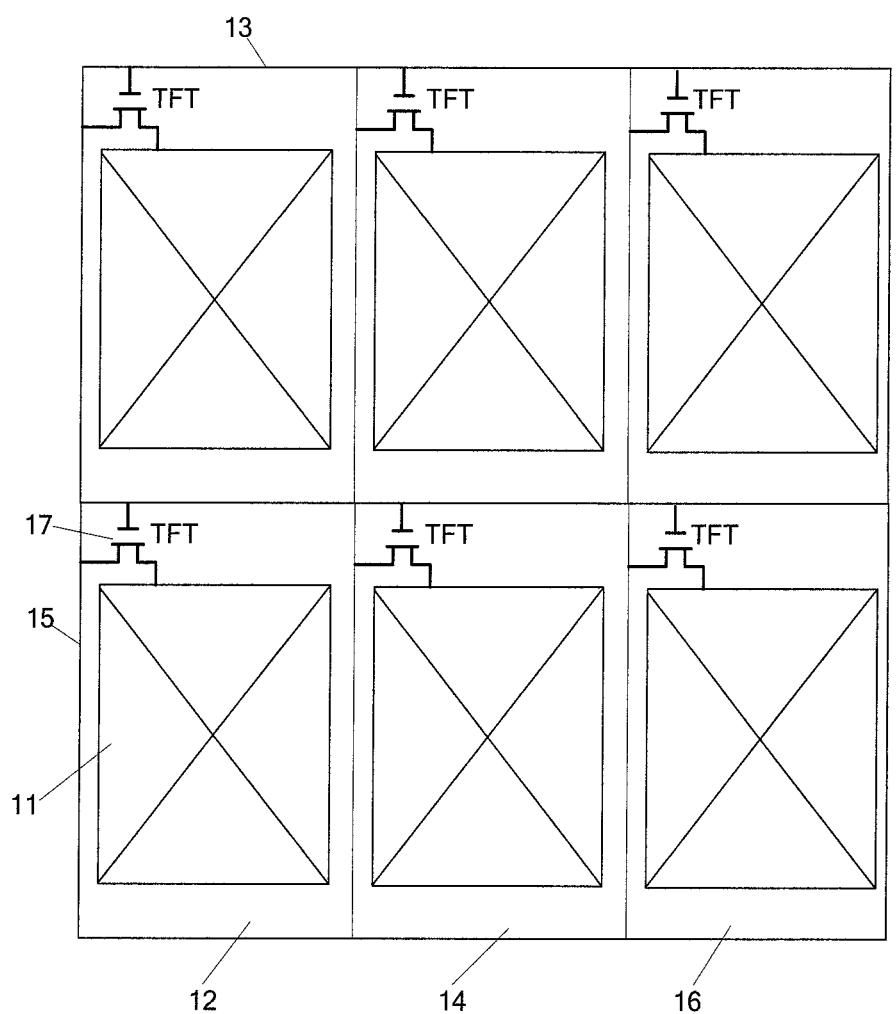
FIG. 2 illustrates a schematic plan view of an array substrate of the display panel of FIG. 1.

According to a general technical concept of the present disclosure, there is provided a display panel. As illustrated in FIG. 1, the display panel comprises an array substrate 1, an opposing substrate 3, and a liquid crystal layer 2 provided between the array substrate 1 and the opposing substrate 3. As illustrated in FIG. 2, the array substrate 1 comprises a plurality of data lines 11, a plurality of gate lines 13 and a plurality of pixel units 12, 14, 16 formed to be distributed in an array. The opposing substrate 3 comprises a base substrate 31, a common electrode layer 33 provided on a surface of one side of the base substrate 31 facing towards the liquid crystal layer 2 and a first touch electrode 32 provided on the other side of the base substrate 31 facing away from the liquid crystal layer 2.

Figure 3:
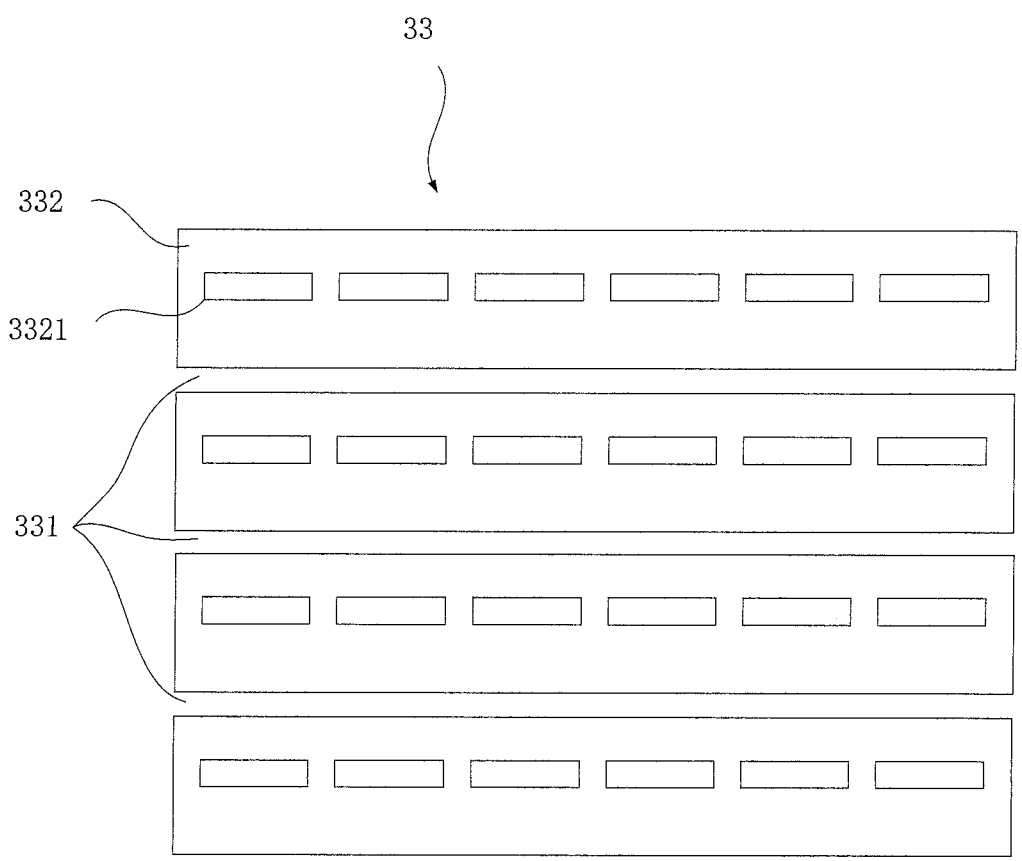
FIG. 3 illustrates a schematic structural view of a second touch electrode of a common electrode layer of the display panel according to an exemplary embodiment of the disclosure.

As further illustrated in FIG. 3, the common electrode layer 33 comprises a plurality of strip-shaped second touch electrodes 332, each of the second touch electrodes 332 overlaps or coincides with at least one row of the pixel units, e.g., a row of pixel units 12, 14, 16 as illustrated in FIG. 2. As illustrated in FIG. 3, a gap region 331 is formed between adjacent second touch electrodes 332. As such, the common electrode layer 33 comprises a non-gap region occupied by the plurality of strip-shaped second touch electrodes 332 and the gap region formed between adjacent second touch electrodes 332.

According to an exemplary embodiment of the disclosure, a slot structure is formed within each of the second touch electrodes 332 of the common electrode layer 33. As illustrated in FIG. 3, the slot structure provided within each of the second touch electrodes 332 is formed by a plurality of slots 3321, and the slots 3321 within each of the second touch electrodes 332 are arranged in a direction in parallel with a row direction of one row of pixel units corresponding to the second touch electrode 332. As illustrated in FIG. 3, the plurality of slots 3321 within each of the second touch electrodes 332 are spaced apart from one another and arranged in line at intervals so as to form the slot structure thereof, and the second touch electrodes 332 between adjacent slots 3321 are not excavated. The slot structure thus formed is provided with a construction similar to that of the gap region 331; i.e., except for the second touch slots 332 which are not excavated, the slot structure provided within each of the second touch electrodes 332 is shaped to be similar to one gap region 331, especially in that, not only respective overall spans in a longitudinal direction in parallel with the row direction but also respective widths in a transverse direction orthogonal to the longitudinal direction are substantially the same, and both are in a form of rectangular shape as illustrated, or alternatively an elongated ellipse shape, such that a differentiation of the common electrode layer between the gap region and the non-gap region decreases. Therefore, a differentiation of display effect of the display panel between the gap region and the non-gap region is also reduced, such that the display uniformity of the liquid crystal display panel is enhanced and the phenomenon of black stripes appearing on a display screen is eliminated. Furthermore, since the second touch electrode 332 between adjacent slots 3321 are not excavated, the slot structure thus formed may not influence an overall resistance of the common electrode layer significantly.

In an exemplary embodiment of the disclosure, each strip-shaped second touch electrode 332 corresponds to a row of the pixel units, i.e., a projection of a low of the pixel units the opposing substrate 3 substantially overlaps or coincides with corresponding one of the second touch electrodes 332. The gap region 331 between each pair of adjacent second touch electrodes 332 aligns with one gate line 13 provided on the array substrate 1, i.e., a projection of one gate line 13 provided on the array substrate 1 onto the opposing substrate 3 overlaps corresponding one gap region 331. There is a one-to-one correspondence between the plurality of slots 3321 within one of the second touch electrodes 332 and pixel units in corresponding one row of the pixel units, i.e., a projection of each pixel unit in a row of the pixel units onto the opposing substrate 3 substantially overlaps or coincides with a corresponding slot 3321 within the second touch electrode 332. Moreover, within each pair of one slot structure and one row of pixel units which correspond to each other in pairs, projections of the gate lines or the data lines of the pixel units on the opposing substrate 3 substantially overlap the slot structures. As such, it is considered that both the slot structure of the second touch electrode and the gap region align with the gate lines on the array substrate, therefore, a differentiation of electrical field between the gap region and the non-gap region may be reduced so as to avoid the defective display phenomenon of presenting dark-colored stripes.

Figure 4:
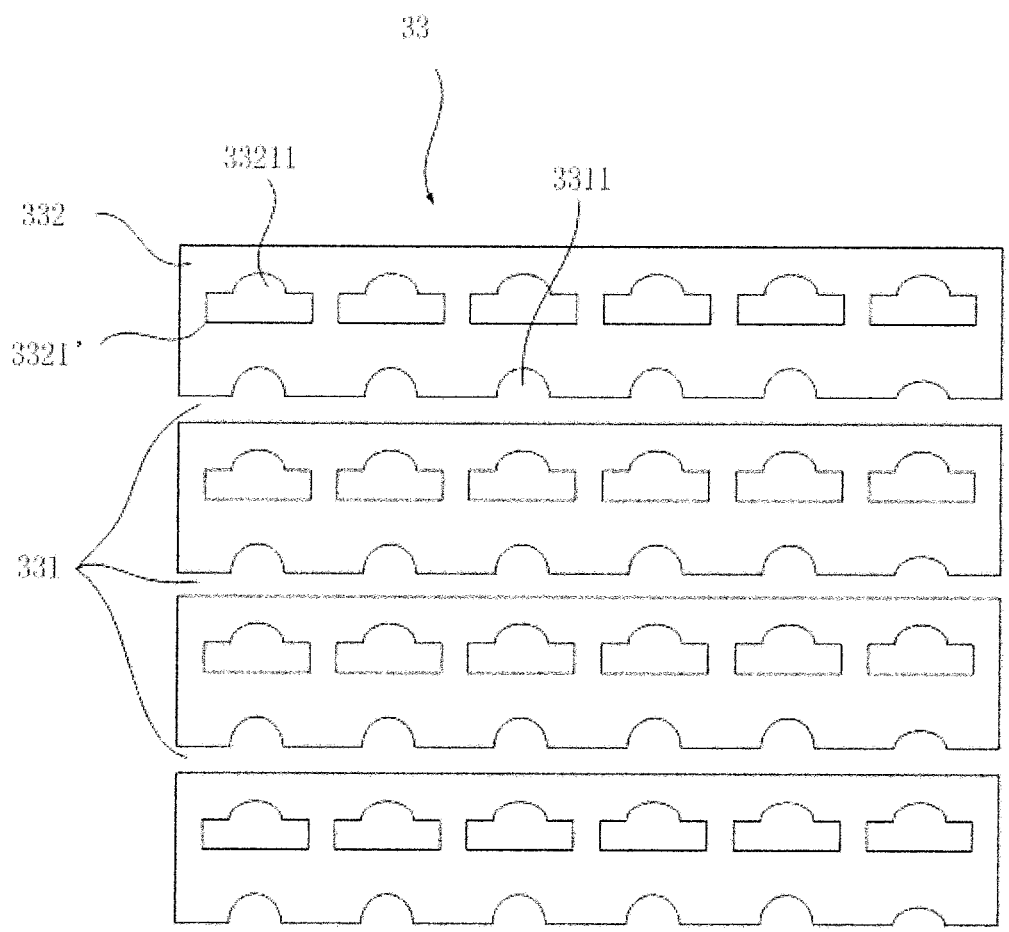
FIG. 4 illustrates a schematic structural view of a second touch electrode of a common electrode layer of the display panel according to another exemplary embodiment of the disclosure.

According to anther exemplary embodiment of the disclosure, as illustrated in FIG. 4, the slot structure provided within each of the second touch electrodes 332 comprises a plurality of slots 3321' and a plurality of via-holes 33211. In an embodiment, the exemplary slot 3321 is substantially the same in terms of both structure and position as the slot illustrated in FIG. 3. Each via-hole 33211 with each of the second touch electrodes 332 communicates with a corresponding slot 3321' so as to form a through opening, and there is a one-to-one correspondence between the via-holes 33211 provided within each of the second touch electrodes 332 and thin film transistors of each pixel unit within a corresponding row of the pixel units, respectively. For example, as illustrated in FIG. 4, each via-hole 33211 is shaped to be a semilunar shape whose arc chord is in the row direction, but by way of example, may also be shaped to be other closed planar geometry or geometries.

As illustrated in FIG. 4, within each pair of one slot structure and one row of pixel units which correspond to each other in pairs, the slot structure comprises a plurality of slots 3321' and a plurality of via-holes 33211 both arranged in the row direction of the pixel units, and the through opening which is formed by each pair of the via-holes 33211 and the slots 3321' communicating with each other in pairs aligns with the gate line(s) of at least one pixel unit. In an embodiment, as illustrated in FIG. 4, in edges of the second touch electrodes 332 adjacent to the gap regions 331, a plurality of throughholes 3311 are further formed to be in communication with corresponding gap regions 331 respectively, so as to form through openings recessed from the gap region 331 towards an inner portion of the second touch electrode. As illustrated in FIG. 4, each of the plurality of the throughholes 3311 is also shaped to be a semilunar shape whose arc chord is in the row direction, but by way of example, may also be shaped to be other closed planar geometry or geometries. There is a one-to-one correspondence between the plurality of throughholes 3311 within one gap region 331 and the plurality of via-holes 33211 within one of the second touch electrodes 332, and the throughholes 3311 are shaped to be similar to the via-holes 33211. The gap region 331 and the throughholes 3311 thus formed correspond to the slot structure which is formed within the second touch electrode 332 and comprises the slots 3321' and the via-holes 33211, such that the differentiation of the common electrode layer between the gap region and the non-gap region is reduced. Therefore, a differentiation of display effect of the display panel between the gap region and the non-gap region is reduced, such that the display uniformity of the liquid crystal display panel is enhanced and the phenomenon of black stripes appearing on the display screen is eliminated.

In an exemplary embodiment as illustrated in FIG. 4, the throughholes 3311 formed within one gap region 331 are arranged at intervals in line but fail to be in communication with one another. The plurality of the via-holes 33211 contained within each slot structure in the non-gap region are also arranged at intervals in line, and the second touch electrodes 332 between adjacent via-holes 33211 are not excavated. The slot structure thus formed may not influence an overall resistance of the common electrode layer; besides, the slot structure may not only enhance the display uniformity of the display panel but also eliminate the black stripes appearing on the display screen.

Furthermore, within each pair of one slot structure and one row of pixel units which correspond to each other in pairs, there is a one-to-one correspondence between the slots 3321' and the via-holes 33211 both contained within the slot structure and pixel units of one corresponding row of the pixel units; and within each pair of the slots 3321', via-holes 33211 and pixel units which correspond to each other in pairs, the slots 3321', the via-holes 33211 align with the gate lines of the pixel units, i.e., projections of the gate lines of the pixel units on the opposing substrate overlap the slots 3321' and the via-holes 33211. Moreover, the gap region 331 between two adjacent second touch electrodes 332 aligns with one corresponding gate line or data line, i.e., projections of the gate lines of the pixel units onto the opposing substrate overlap corresponding gap region 331. As such, not only a differentiation of electrical field between the gap region and the non-gap region may be reduced so as to avoid the defective display phenomenon of presenting dark-colored stripes, but also the slot structures of various pixel units are relatively independent thereamong so as to ensure independence of respective pixel unit upon displaying images without any influence of other pixel units.

In an optional exemplary embodiment of the disclosure, the first touch electrode 32 is a touch signal receiver electrode and the second touch electrodes 332 are touch signal transmitter electrodes.

In another optional exemplary embodiment of the disclosure, the first touch electrode 32 is a touch signal transmitter electrode and the second touch electrodes 332 are touch signal receiver electrodes.

Besides, a display device is further provided by an embodiment of the disclosure, comprising the display panel as above. By the display device which uses aforementioned display panel, the display uniformity upon displaying images may be improved and there will be no dark-colored stripes appearing on the display screen.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although the disclosure is described in view of the attached drawings, the embodiments disclosed in the drawings are only intended to illustrate the preferable embodiment of the present disclosure exemplarily, and should not be deemed as a restriction thereof.

Although several exemplary embodiments of the general concept of the present disclosure have been shown and described, it would be appreciated by those skilled in the art that various changes or modifications may be made in these embodiments without departing from the principles and spirit of the disclosure and lie within the scope of present application, which scope is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A display panel, comprising:
an array substrate,
an opposing substrate, and
a liquid crystal layer provided between the array substrate and the opposing substrate,
wherein the array substrate comprises a plurality of data lines, a plurality of gate lines and a plurality of pixel units distributed in an array, and the opposing substrate comprises a base substrate, a common electrode layer provided on one side of the base substrate facing towards the liquid crystal layer and a first touch electrode provided on the other side of the base substrate facing away from the liquid crystal layer, and
wherein the common electrode layer comprises a plurality of second touch electrodes in a form of strips, each of the second touch electrodes overlaps or coincides with a projection of at least one row of the pixel units on the opposing substrate, a gap region being formed between each pair of neighboring second touch electrodes and a slot structure being provided within each of the second touch electrodes.

2. The display panel according to claim 1, wherein the slot structure provided within each of the second touch electrodes is shaped to be similar to one gap region.

3. The display panel according to claim 1, wherein the slot structure provided within each of the second touch electrodes comprises a plurality of slots, each pair of neighboring slots being spaced apart from each other by the second touch electrode.

4. The display panel according to claim 1, wherein the slot structure provided within each of the second touch electrodes comprises a plurality of slots and a plurality of via-holes, one slot being in communication with respective one via-hole so as to form a through opening, and each pair of neighboring through openings being spaced apart by the second touch electrode.

5. The display panel according to claim 1, wherein projections of the gate lines or the data lines of the pixel units on the opposing substrate overlap the slot structures.

6. The display panel according to claim 1, wherein projections of the gate lines or the data lines of the pixel units on the opposing substrate overlap the gap regions between each pair of neighboring second touch electrodes.

7. The display panel according to claim 3, wherein the plurality of slots are arranged in a direction in parallel with a direction of the row of the pixel units.

8. The display panel according to claim 4, wherein the plurality of slots and the plurality of via-holes are arranged in a direction in parallel with a direction of the row of the pixel units.

9. The display panel according to claim 4, wherein there is a one-to-one correspondence between the plurality of via-holes provided within each of the second touch electrodes and thin film transistors of each pixel unit within the row of the pixel units, respectively.

10. The display panel according to claim 4, wherein in edges of the second touch electrodes adjacent to the gap regions, a plurality of throughholes are formed to be in communication with the gap regions.

11. The display panel according to claim 1, wherein the first touch electrode is a touch signal receiver electrode and the second touch electrodes are touch signal transmitter electrodes.

12. The display panel according to claim 1, wherein the first touch electrode is a touch signal transmitter electrode and the second touch electrodes are touch signal receiver electrodes.

13. A display device, comprising the display panel according to claim 1.

14. The display panel according to claim 2, wherein the slot structure provided within each of the second touch electrodes comprises a plurality of slots, each pair of neighboring slots being spaced apart from each other by the second touch electrode.

15. The display panel according to claim 2, wherein the slot structure provided within each of the second touch electrodes comprises a plurality of slots and a plurality of via-holes, one slot being in communication with respective one via-hole so as to form a through opening, and each pair of neighboring through openings being spaced apart by the second touch electrode.

16. The display panel according to claim 2, wherein projections of the gate lines or the data lines of the pixel units on the opposing substrate overlap the slot structures.

17. The display panel according to claim 3, wherein projections of the gate lines or the data lines of the pixel units on the opposing substrate overlap the slot structures.

18. The display panel according to claim 4, wherein projections of the gate lines or the data lines of the pixel units on the opposing substrate overlap the slot structures.

19. The display panel according to claim 2, wherein projections of the gate lines or the data lines of the pixel units on the opposing substrate overlap the gap regions between each pair of neighboring second touch electrodes.

20. The display panel according to claim 3, wherein projections of the gate lines or the data lines of the pixel units on the opposing substrate overlap the gap regions between each pair of neighboring second touch electrodes.

* * * * *